(12) United States Patent
Miyakawa et al.

(10) Patent No.: US 11,210,954 B2
(45) Date of Patent: Dec. 28, 2021

(54) VEHICULAR COMMUNICATION APPARATUS, AND VEHICLE CONTROL SYSTEM AND TRAFFIC SYSTEM USING THE VEHICULAR COMMUNICATION APPARATUS

(71) Applicant: SUBARU CORPORATION, Tokyo (JP)

(72) Inventors: Haruyo Miyakawa, Tokyo (JP); Hyoungwook Choi, Tokyo (JP); Satoru Ikeda, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 234 days.

(21) Appl. No.: 16/458,525

(22) Filed: Jul. 1, 2019

(65) Prior Publication Data

US 2020/0105142 A1 Apr. 2, 2020

(30) Foreign Application Priority Data

Sep. 27, 2018 (JP) .............................. JP2018-181320

(51) Int. Cl.
*G08G 1/16* (2006.01)
*B60W 30/095* (2012.01)
*B60W 50/00* (2006.01)

(52) U.S. Cl.
CPC .......... *G08G 1/166* (2013.01); *B60W 30/0953* (2013.01); *B60W 30/0956* (2013.01); *B60W 50/0097* (2013.01); *G08G 1/162* (2013.01); *B60W 2554/00* (2020.02); *B60W 2554/80* (2020.02)

(58) Field of Classification Search
CPC ... G08G 1/166; G08G 1/162; B60W 30/0953; B60W 30/0956; B60W 50/0097; B60W 2554/00; B60W 2554/80; G01S 17/58; G01S 17/931; G06K 9/3241
See application file for complete search history.

(56) References Cited

U.S. PATENT DOCUMENTS

| | | | | |
|---|---|---|---|---|
| 2010/0328644 | A1* | 12/2010 | Lu ............................. | B60R 1/00 356/5.01 |
| 2016/0034767 | A1* | 2/2016 | Saptharishi ...... | G08B 13/19613 348/143 |
| 2017/0034667 | A1* | 2/2017 | Kumabe ............... | G06F 21/305 |

FOREIGN PATENT DOCUMENTS

| | | |
|---|---|---|
| JP | 2015207940 | 11/2015 |
| JP | 2018101384 | 6/2018 |

* cited by examiner

*Primary Examiner* — Anne Marie Antonucci
*Assistant Examiner* — Andrew J Cromer
(74) *Attorney, Agent, or Firm* — Chip Law Group

(57) ABSTRACT

A vehicular communication apparatus is configured to be mounted on a movable body and to receive movement data related to movements of other movable bodies. The apparatus includes an acquiring unit, a memory, and a data managing unit. The acquiring unit is configured to acquire the movement data on the other movable bodies. The memory is configured to store and record therein the movement data acquired by the acquiring unit. The data managing unit is configured to manage the record of the movement data in the memory. The data managing unit is configured to acquire a virtual speed of each movable body that is obtained from the movement data recorded in the memory, and invalidate or delete the movement data recorded in the memory on a movable-body by movable-body basis, in accordance with the acquired virtual speed of each movable body.

11 Claims, 8 Drawing Sheets

FIG. 3A
FIG. 3B
FIG. 3C
FIG. 3D
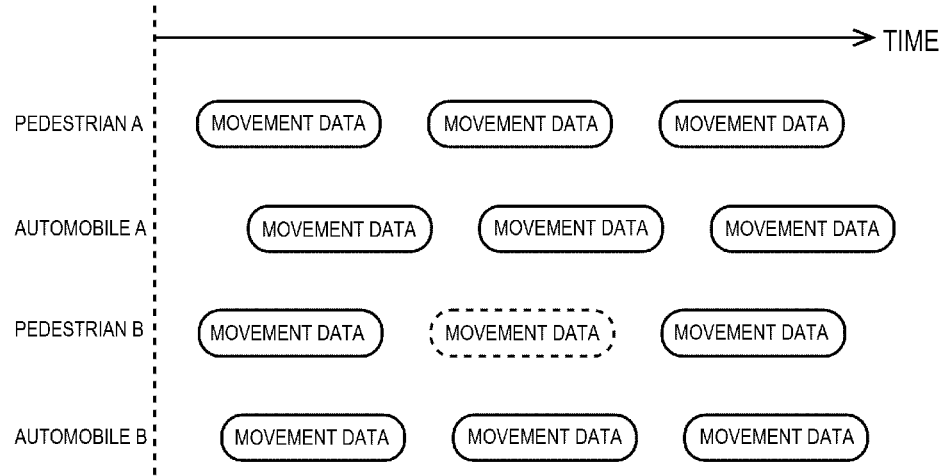
FIG. 3E
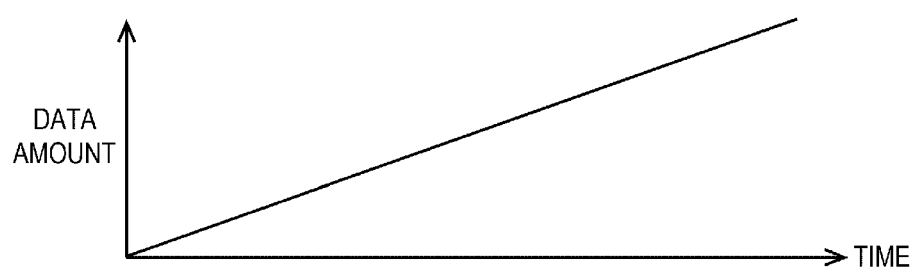

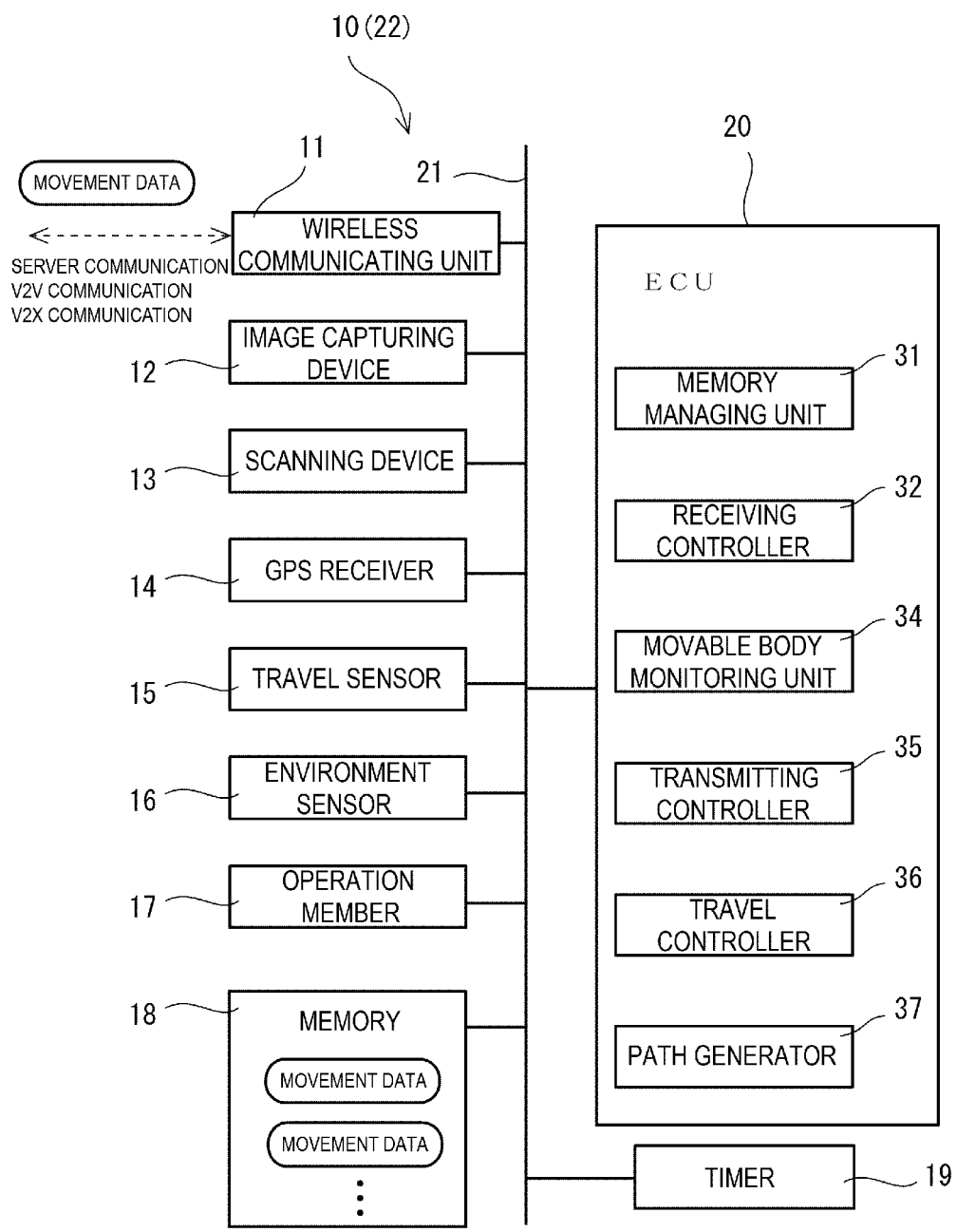

VEHICULAR COMMUNICATION APPARATUS, AND VEHICLE CONTROL SYSTEM AND TRAFFIC SYSTEM USING THE VEHICULAR COMMUNICATION APPARATUS

CROSS-REFERENCE TO RELATED APPLICATIONS

The present application claims priority from Japanese Patent Application No. 2018-181320 filed on Sep. 27, 2018, the entire contents of which are hereby incorporated by reference.

BACKGROUND

The disclosure relates to a vehicular communication apparatus, and a vehicle control system and a traffic system using the same.

In recent years, as for vehicles such as automobiles on which persons get when moving, it has been considered to assist or automatically control the travel of the vehicles and the operation of devices that are used in the vehicles. Moreover, in order to improve, for example, the safety, the smoothness, the movement cost, the comfortableness, and the environmental friendliness of vehicles when moving, it is desirable to control the vehicles, not only based on information separately detected by each vehicle, but also using complex information obtained by widely acquiring and collecting information related to movements of other movable bodies such as the other vehicles except the host vehicle and pedestrians, and information on a travel environment.

Traffic systems available for this purpose include, for example, an intelligent transport system (ITS), a cooperative ITS, universal traffic management systems (UTMS), an advanced rapid transit (ART), and a public transportation priority system (PTPS), and the study and the development of these systems have been progressed. Moreover, as for the cooperative ITS, the standard TC204/WG18 is formulated.

SUMMARY OF THE INVENTION

An aspect of the disclosure provides a vehicular communication apparatus configured to be mounted on a movable body and to receive movement data related to movements of other movable bodies. The apparatus includes an acquiring unit, a memory, and a data managing unit. The acquiring unit is configured to acquire the movement data on the other movable bodies. The memory is configured to store and record therein the movement data acquired by the acquiring unit. The data managing unit is configured to manage the record of the movement data in the memory. The data managing unit is configured to acquire a virtual speed of each movable body that is obtained from the movement data recorded in the memory, and invalidate or delete the movement data recorded in the memory on a movable-body by movable-body basis, in accordance with the acquired virtual speed of each movable body.

An aspect of the disclosure provides a vehicular communication apparatus configured to be mounted on a movable body and to receive movement data related to movements of other movable bodies. The apparatus includes an acquiring unit, a memory, a data managing unit, and a transmitting unit. The acquiring unit is configured to acquire the movement data on the other movable bodies. The memory is configured to store and record therein the movement data acquired by the acquiring unit. The data managing unit is configured to manage the record of the movement data in the memory. The transmitting unit is configured to transmit the movement data recorded in the memory to the other movable bodies. The data managing unit is configured to determine whether courses of the other movable bodies intersect with each other, invalidate or delete the movement data, stored in the memory, on other movable bodies whose courses are determined not to intersect, on a movable-body by movable-body basis, and not invalidate or delete the movement data, stored in the memory, on other movable bodies whose courses are determined to intersect, on the movable-body by movable-body basis, and the transmitting unit is configured to transmit, to the other movable bodies, the movement data which is stored in the memory and which is managed by the data managing unit.

An aspect of the disclosure provides a vehicle control system including: the vehicular communication apparatus; and a vehicle control apparatus configured to control a vehicle using the movement data recorded in the memory of the vehicular communication apparatus.

An aspect of the disclosure provides a traffic system including: the vehicular communication apparatus; and a server apparatus configured to transmit and receive movement data related to the movements of the movable bodies to and from the vehicular communication apparatus.

An aspect of the disclosure provides a vehicular communication apparatus configured to be mounted on a movable body and to receive movement data related to movements of other movable bodies. The apparatus includes circuitry. The circuitry is configured to acquire the movement data on the other movable bodies. The circuitry is configured to store and record therein the acquired movement data. The circuitry is configured to manage the record of the movement data. The circuitry is configured to acquire a virtual speed of each movable body that is obtained from the recorded movement data, and invalidate or delete the recorded movement data on a movable-body by movable-body basis, in accordance with the acquired virtual speed of each movable body.

An aspect of the disclosure provides a vehicular communication apparatus configured to be mounted on a movable body and to receive movement data related to movements of other movable bodies. The apparatus includes circuitry. The circuitry is configured to acquire the movement data on the other movable bodies. The memory is configured to store and record therein the acquired movement data. The circuitry is configured to manage the record of the movement data. The transmitting unit is configured to transmit the recorded movement data to the other movable bodies. The circuitry is configured to determine whether courses of the other movable bodies intersect with each other, invalidate or delete the stored movement data on other movable bodies whose courses are determined not to intersect, on a movable-body by movable-body basis, and not invalidate or delete the stored movement data on other movable bodies whose courses are determined to intersect, on the movable-body by movable-body basis, and the circuitry is configured to transmit, to the other movable bodies, the movement data stored and managed.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 3A to FIG. 3E are explanatory diagrams illustrating a correspondence relationship between generation status of movement data related to the movements of the plurality of movable bodies and the amount of data stored in a memory.

FIG. 4 is an explanatory diagram illustrating an example of a vehicle control system that is provided with a vehicular communication apparatus according embodiments

DETAILED DESCRIPTION

Figure 1:
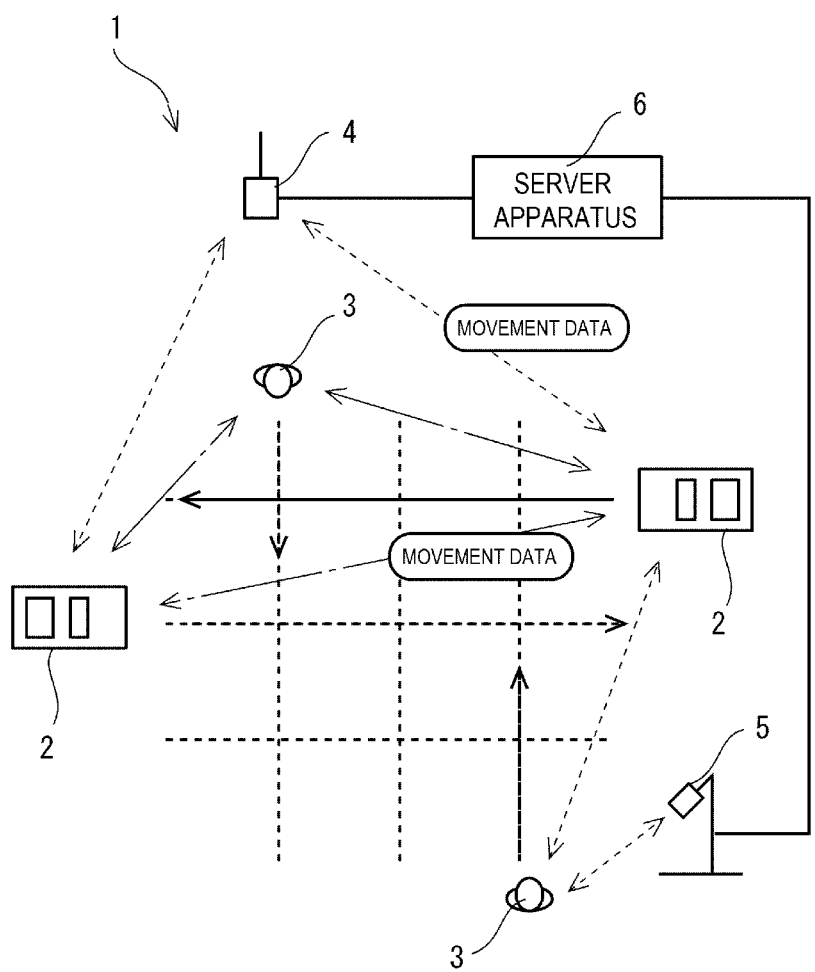
FIG. 1 is a schematic explanatory diagram illustrating an example of a traffic system according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. In a situation in which information on movable bodies and the like can be actually transmitted and received, vehicles such as automobiles that collect and process movement data on movements of movable bodies would be to acquire a large amount of movement data and to use the data for control of the vehicles.

However, a vehicle of related art such as an automobile simply processes data detected by the host vehicle, and receives and processes static congestion data into which movements of individual movable bodies are collectively abstracted and partial map data for guiding a path, in an area including the host vehicle position.

In other words, even if a technology enables current vehicles to widely collect information on movable bodies, the current vehicles cannot appropriately acquire widely collected dynamic movement data on a large number of the movable bodies and control the travel or the like of the vehicles based on the acquired large amount of the dynamic movement data.

Japanese Unexamined Patent Application Publication (JP-A) No. 2015-207940 discloses a technique of deleting old data, as a technique under study and development. JP-A No. 2018-101384 discloses a technique of deleting data after a predetermined time has elapsed.

However, those techniques basically delete old data uniformly. When these techniques are applied to a large amount of dynamic movement data on movable bodies, there is a possibility that the data to be deleted may contain useful data. Moreover, there is a possibility that unnecessary data may remain in new data to be not deleted. Such data remains to cause not only the shortage of the memory, but also there is a possibility that the vehicle can never move forward or the movement of the vehicle is unnecessarily and excessively reactive.

It is desirable for a vehicle such as an automobile to appropriately acquire movement data on a plurality of movable bodies that can be collected.

First Embodiment

FIG. 1 is a schematic explanatory diagram illustrating an example of a traffic system 1 according to an example of the disclosure.

FIG. 1 illustrates a plurality of vehicles 2 serving as a plurality of movable bodies, and a plurality of pedestrians 3 serving as low-speed movable bodies. In the vehicles 2 such as automobiles on which persons get when moving, assisting or automatically controlling the travel of the vehicles 2 and the operation of devices that are used in the vehicles 2 have become available. In addition to an automobile or an electric vehicle on which a plurality of persons can get, examples of the vehicles 2 include a motor cycle, a personal mobility aid, a cart, and an electric wheelchair.

The traffic system 1 in FIG. 1 includes a plurality of vehicular communication apparatuses, a plurality of pedestrian communication apparatuses, a base station 4, a beacon apparatus 5, and a server apparatus 6. The plurality of vehicular communication apparatuses are respectively provided to the vehicles 2 such as automobiles. The plurality of pedestrian communication apparatuses are respectively carried by the low-speed movable bodies such as the pedestrians 3. FIG. 1 illustrates the vehicles 2 in place of the vehicular communication apparatuses and the pedestrians 3 in place of the pedestrian communication apparatuses. The traffic system 1 may use a base station of a commercial wireless communication and a communication apparatus that is disposed on a road shoulder of a highway, as the base station 4.

In the traffic system 1 in FIG. 1, the communication apparatus of each of the vehicles 2 and the pedestrians 3 transmits movement data related to a movement of itself as a movable body to the server apparatus 6 via the base station 4 or the beacon apparatus 5. The server apparatus 6 collects the movement data related to the movements of the plurality of movable bodies, generates data on traffic information as necessary based on the collected movement data, and transmits the movement data and the data on the traffic information to the communication apparatuses. The server apparatus 6 transmits and receives the movement data related to the movements of the movable bodies, to and from the vehicular communication apparatuses.

In the traffic system 1 in FIG. 1, the communication apparatus of each of the vehicles 2 and the pedestrians 3 transmits the movement data related to the movement of itself as a movable body to another communication apparatus that is in the vicinity thereof.

Upon receipt of the movement data and the like from the server apparatus 6 or a communication apparatus of another movable body, each communication apparatus stores and uses the movement data and the like for control of the movement of itself.

For example, in FIG. 1, the right-hand vehicle 2 travels straight leftward. The left-hand vehicle 2 in FIG. 1 travels straight rightward. The right-hand vehicle 2 and the left-hand vehicle 2 in FIG. 1 pass each other on a bidirectional road, for example.

The lower-right-hand pedestrian 3 in FIG. 1 travels straight upward. Before the lower-right-hand pedestrian 3 with a low movement speed reaches intersecting positions of courses of the right-hand vehicle 2 and the left-hand vehicle 2 in FIG. 1, the right-hand vehicle 2 and the left-hand vehicle 2 have passed the intersecting positions.

In contrast, the upper-left-hand pedestrian 3 in FIG. 1 travels straight downward. Accordingly, there is a possibility that before and after the timing when the upper-left-hand pedestrian 3 reaches an intersecting position, the right-hand vehicle 2 in FIG. 1 may reach the intersecting position.

In this case, the vehicular communication apparatus mounted on the right-hand vehicle 2 in FIG. 1 accelerates or decelerates the movement speed of the host vehicle so that the right-hand vehicle 2 does not pass through the intersecting position simultaneously with the upper-left-hand pedestrian 3, based on pre-received movement data related to the movement of the upper-left-hand pedestrian 3.

It is expected that the traffic system 1 transmits and receives movement data related to movements of a plurality of movable bodies to and from the plurality of movable bodies to allow the plurality of movable bodies to move in safety.

For example, the vehicle 2 can control the vehicle 2 not only based on information detected by the vehicle 2 itself, but also using complex information obtained by widely acquiring and collecting (i) information related to movements of other movable bodies, such as other vehicles than the host vehicle, and the pedestrians 3, and (ii) information on an travel environment.

Transmitting and receiving the movement data among the plurality of movable bodies using the traffic system 1 in this manner can improve the safety, the smoothness, the movement cost, the comfortableness, and the environmental friendliness of the movements of the movable bodies.

Examples of the traffic system 1 available for such a case include an intelligent transport system (ITS), a cooperative ITS, universal traffic management systems (UTMS), an advanced rapid transit (ART), and a public transportation priority system (PTPS). The cooperative ITS is standardized by the standard TC204/WG18.

Figure 2:
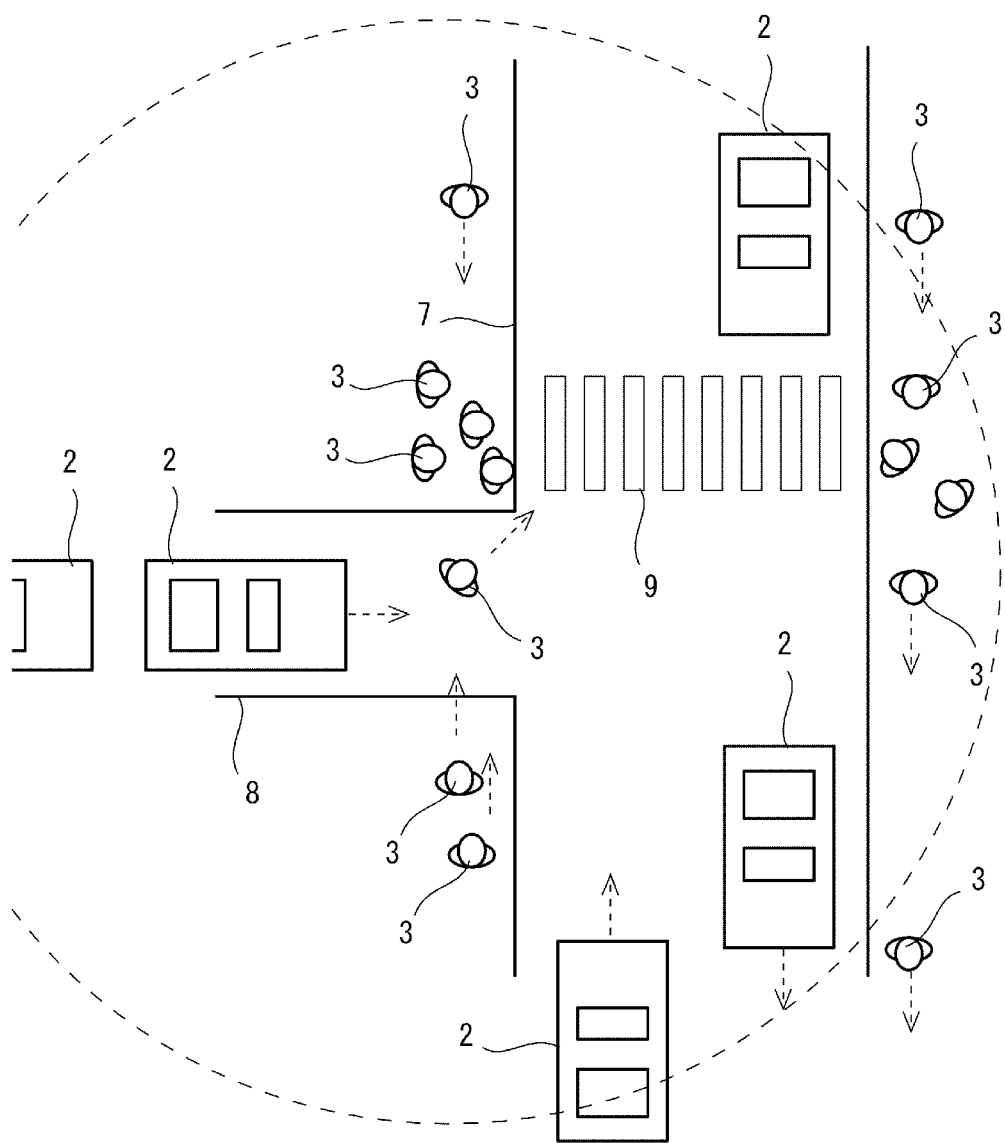
FIG. 2 is an explanatory diagram illustrating an example in which vehicles and pedestrians are moving as a plurality of movable bodies.

FIG. 2 is an explanatory diagram illustrating an example in which the vehicles 2 and the pedestrians 3 are moving as a plurality of movable bodies.

FIG. 2 illustrates a main road 7 that extends in the vertical direction, and an alley 8 that extends in the left direction from the main road 7. The vehicles 2 such as automobiles move on central portions of the main road 7 and the alley 8. The pedestrians 3 move on side portions of the main road 7 and the alley 8. Moreover, the pedestrians 3 stop before a pedestrian crossing 9 on a red traffic signal, and cross the main road 7 on the pedestrian crossing 9 when the traffic signal turns to green. FIG. 2 illustrates a large number of the pedestrians 3 and a large number of the vehicles 2.

In order to achieve the above-mentioned object of the traffic system 1, the vehicle 2 that travels on the main road 7 from the lower part to the upper part in FIG. 2 in such a travel environment, for example, is cautious about not only another vehicle 2 such as an oncoming vehicle that travels on the same main road 7, but also a large number of pedestrians 3 that walk on the road side stripe near the vehicle 2, the pedestrian 3 and the vehicle 2 that appear from the alley 8, and travels by finely adjusting a course thereof so as not to come into contact, such as collision, with these.

Accordingly, the vehicle 2 is to instantaneously acquire movement data having information, such as the positions and the speed of a large number of other movable bodies that are present in the surrounding thereof. This enables the vehicle 2, when passing by another movable body, to adjust the course so as not to come into contact with the other movable body.

Each movable body is to continuously acquire the latest movement data on a large number of other movable bodies that are present in the surrounding of the movable body itself. For example, the vehicle 2 that is located at the head on the alley 8 is to continuously acquire the latest movement data on a large number of other movable bodies that are in an area surrounded by a circular dashed line.

Moreover, each movable body is unable to limit the number of other movable bodies that are present in the surrounding thereof by the movable body itself.

FIG. 3A to FIG. 3E are explanatory diagrams illustrating a correspondence relationship between a generation status of movement data related to movements of a plurality of movable bodies and the amount of data stored in a memory 18.

FIG. 3A illustrates plural pieces of movement data on a pedestrian A.

FIG. 3B illustrates plural pieces of movement data on a vehicle A.

FIG. 3C illustrates plural pieces of movement data on a pedestrian B.

FIG. 3D illustrates plural pieces of movement data on a vehicle B.

In FIG. 3A to FIG. 3D, the plural pieces of movement data are generated in order from the left side to the right side.

FIG. 3E illustrates a time change graph illustrating the total data amount of the movement data from FIG. 3A to FIG. 3D.

As illustrated in the graph in FIG. 3E, the total data amount of the movement data proportionally increases in accordance with the elapse of time. Moreover, the increase ratio of the total data amount becomes larger as the number of movable bodies increases more.

In order to achieve the object of the traffic system 1, as illustrated in FIG. 3A to FIG. 3D, each movable body repeatedly transmits movement data having information, such as the latest position and speed thereof, at as short intervals as possible.

As a result, as illustrated in FIG. 3E, the total data amount of the movement data that are transmitted and received among the plurality of movable bodies dramatically increases in accordance with the number of movable bodies to be collected and the elapsed time from when the collection is started. The amount of data stored in the memory by each movable body in order to monitor the movements of the other movable bodies also increases in the same tendency.

As in the foregoing, in order to achieve the object of the traffic system 1, the communication apparatus in each movable body that is provided to the vehicle 2 or the like and acquires and collects the movement data is to appropriately collect such a large number of movement data and use the large number of movement data for control of a movement thereof.

The vehicle 2 such as an automobile has no experience of having treated such a large number of data.

However, a vehicle 2 of related art such as an automobile simply has a data processing ability of processing data detected by the host vehicle, and receiving and processing static congestion data into which movements of individual movable bodies are collectively abstracted and partial map data for guiding a path, in an area including the host vehicle position.

In other words, even if a technology enables current vehicles to widely collect information on movable bodies, the current vehicles cannot appropriately acquire widely collected dynamic movement data on a large number of the movable bodies or control the travel and the like of the vehicles by processing the acquired dynamic movement data.

Moreover, even if the current vehicle has such a processing ability, there is a possibility that the vehicle cannot move forward at all or that an unnecessarily and excessively reacted movement of the vehicle occurs.

Therefore, it may be contemplated, for example, that the vehicular communication apparatus delete old movement data to reduce the total amount of movement data that is stored and used therein.

However, when such old movement data is uniformly deleted, there is a possibility that movement data to be deleted may include useful data. Moreover, there is a possibility that unnecessary data may remain in new movement data to be not deleted.

It is desired that the vehicular communication apparatus that is used in the vehicle 2 such as an automobile can excellently acquire movement data on a plurality of movable bodies that is collected in the traffic system 1, and excellently control the travel and the like of the vehicle 2 based on the acquired movement data.

Hereinafter, measures taken in the present embodiment will be described.

FIG. 4 is an explanatory diagram illustrating an example of a vehicle control system 10 that is provided with a vehicular communication apparatus according to the embodiment of the disclosure.

The vehicle control system 10 in FIG. 4 is provided to the vehicle 2 as a movable body, and controls the travel and the like of the vehicle 2.

The vehicle control system 10 in FIG. 4 includes a wireless communicating unit 11, an image capturing device 12, a scanning device 13, a GPS receiver 14, a travel sensor 15, an environment sensor 16, an operation member 17, the memory 18, a timer 19, an electronic control unit (ECU) 20, and an in-vehicle network 21 that couples these units. A one-chip microcomputer may include the memory 18, the timer 19, and the like, in addition to the ECU 20. This one-chip microcomputer may be coupled to the in-vehicle network 21.

In FIG. 4, a vehicular communication apparatus 22 may be configured with, for example, the wireless communicating unit 11, the memory 18, the timer 19, and the ECU 20.

The in-vehicle network 21 is a network that couples devices that are provided to the respective units of the vehicle 2, in the vehicle 2 such as an automobile. The in-vehicle network 21 may be a controller area network (CAN), a local interconnect network (LIN), or Ethernet, for example. Moreover, the in-vehicle network 21 may include a relay device, and a plurality of communication cables that are coupled to the relay device. In this case, the devices that are provided to the respective units of the vehicle 2 may be distributed and coupled to the plurality of communication cables. The devices that are provided to the respective units of the vehicle 2 transmit and receive data to and from other devices via the in-vehicle network 21.

The image capturing device 12 captures an image of an inside or a surrounding of the vehicle 2. The vehicle 2 compatible with the traffic system 1 may be provided with the image capturing device 12 that captures at least an image ahead of the vehicle 2. In this case, the vehicle 2 acquires a captured image of another vehicle or the like that is travelling ahead of the vehicle 2.

The scanning device 13 scans another movable body and a fixed installed object that are present in the surrounding of the vehicle 2, by a radar or the like. This enables the vehicle 2 to detect distances or the like to the other movable body and the fixed installed object that are present in the surrounding of the vehicle 2.

The GPS receiver 14 receives radio waves from a GPS satellite, and generates current position information on the vehicle 2. The GPS receiver 14 may receive radio waves from the base station 4 and a radio tower that are fixedly disposed on the ground, and generate or correct the current position information on the vehicle 2. The vehicle 2 may generate the current position information on the vehicle 2 based on radio waves from the base station 4 that are received by the wireless communicating unit 11, for example, different from the GPS receiver 14, or based on detection about the travel of the vehicle 2.

The travel sensor 15 detects information related to actual travel of the vehicle 2. The information related to the actual travel of the vehicle 2 includes, for example, a speed and a movement direction of the vehicle 2. The information related to the actual travel of the vehicle 2 may further include, for example, an operating state of a drive source, an operating state of a transmission, an operating state of a braking device, and a steering state of the vehicle 2.

The environment sensor 16 detects an actual environment at a position where the vehicle 2 is present. Information on the actual environment includes, for example, a state of sunshine, a state of rain, a type of a road surface, the temperature, and the humidity.

The operation member 17 is a member with which an occupant riding on the vehicle 2 operates the travel and the like of the vehicle 2. The operation member 17 includes, for example, a steering wheel, an accelerator pedal, a brake pedal, a shift lever, a wiper switch, a turn signal lever, a start button, and an operation mode switching button. When the occupant operates the operation member 17, the operation member 17 generates information on the operation, and outputs the information.

The timer 19 measures a time duration or a time, and outputs the time duration or the time.

The wireless communicating unit 11 may simply transmit and receive communication data of the traffic system 1. The wireless communicating unit 11 performs communication with the base station 4 and the beacon apparatus 5, for example, which are used in the traffic system 1, and performs vehicle-to-vehicle (V2V) communication or V2X communication with the communication apparatuses, which are used in the other movable bodies. The wireless communicating unit 11 may perform communication with one base station 4 or one beacon apparatus 5 that performs communication in a zone designated by the traffic system 1. In this case, when the vehicle 2 moves over the zone, the traffic system 1 designates one base station 4 or one beacon apparatus 5 that corresponds to a new zone as a destination of a wireless data communication. This enables the wireless communicating unit 11 to transmit and receive the movement data or the like to and from the server apparatus 6 of the traffic system 1 even when the movable body is moving.

Herein, the movement data includes, for example, identification information, attribute information, position information, position detection time information, speed information, and travel direction information on a movable body. The movement data may include, in addition to these, for example, time information corresponding to a generation timing of the movement data, and the like.

The identification information on a movable body may be information for identifying the movable body from other different movable bodies. The identification information on a movable body may be an identification number unique to the movable body, for example. As for the identification number on a movable body, for example, a vehicle body number and a serial number that are assigned to the vehicle 2, a MAC address and an IP address that are assigned to the wireless communicating unit 11, and the like may be used.

The attribute information on a movable body is information indicating the type of the movable body. The types of the movable body include, for example, an automobile, the vehicle 2, the pedestrian 3, a bicycle, a dog, a child, and an elderly person. When the movable body is the vehicle 2, the attribute information may include, for example, information on a manufacturer of the vehicle body, a vehicle type, a model number, a color number, an image of appearance, an exterior option to be made, the type of tires, the type of wheels, a vehicle body number, and the like.

The position information on a movable body may be position information generated by the GPS receiver 14, for example.

The position detection time information on a movable body may be a measurement time by the timer 19 at timing when the GPS receiver 14 receives GPS radio waves, and a measurement time by the timer 19 at timing when the GPS receiver 14 generates position information, for example.

The speed information on a movable body may be an actual speed of the movable body detected by the travel sensor 15, for example.

The travel direction information on a movable body may be an actual movement direction of the movable body detected by the travel sensor 15, for example.

The movement data may simply include a part of these information. The plurality of movable bodies in the traffic system 1 may transmit and receive movement data including different information.

The memory 18 records therein (i) various types of programs that are used in the vehicle 2 and (ii) various data that is used during the execution of the programs. The data to be recorded in the memory 18 includes data acquired in the above-mentioned respective units of the vehicle 2. The movement data received by the wireless communicating unit 11 is stored and recorded in the memory 18, for example.

The ECU 20 reads and executes the program recorded in the memory 18. This implements a controller of the vehicle 2. The controller of the vehicle 2 controls the above-mentioned respective units of the vehicle 2.

FIG. 4 illustrates, as functions of the controller of the vehicle 2 that are implemented by the ECU 20, a memory managing unit 31, a receiving controller 32, a movable body monitoring unit 34, a transmitting controller 35, a travel controller 36, and a path generator 37.

The memory managing unit 31 manages data to be recorded in the memory 18, and executes recording, updating, and deleting of data to the memory 18. The memory managing unit 31 manages the recording of movement data in the memory 18, for example.

The receiving controller 32 acquires reception data on another movable body from the wireless communicating unit 11 and processes the reception data on the other movable body. When the reception data is movement data on another movable body, for example, the receiving controller 32 outputs the acquired movement data on the other movable body to the memory managing unit 31 for recording it in the memory 18. This stores and records plural pieces of the acquired movement data in the memory 18.

The movable body monitoring unit 34 monitors movements of a plurality of other movable bodies, based on the information on the plurality of other movable bodies stored and recorded in the memory 18. The movable body monitoring unit 34 monitors an influence on the course (travel) of the host vehicle, caused by the movement of another movable body, for example.

The movable body monitoring unit 34 predicts courses of the other movable bodies that are present within a monitoring area including the host vehicle and the course, for example, and sets a monitoring level for each of the other movable bodies based on a determination as to an intersection with the course of the host vehicle.

The monitoring level for each of the other movable bodies may be classified into, for example, a high level when the course of another movable body intersects with the course of the host vehicle, a middle level when the course of another movable body approaches the course of the host vehicle, and a low level when the course of another movable body is distant from the course of the host vehicle.

The transmitting controller 35 causes the wireless communicating unit 11 to transmit part or all of the movement data on the plurality of other movable bodies that are stored and recorded in the memory 18.

The path generator 37 generates a movement path along which a movable body moves to a destination, and outputs information on the generated movement path to the memory managing unit 31 for recording the generated movement path in the memory 18.

The travel controller 36 controls the travel of the vehicle 2 by self-driving or driving assist. The travel controller 36 adjusts the course of the vehicle 2 in accordance with the operation of the operation member 17 by the occupant, the movement path recorded in the memory 18, the movement data on the plurality of other movable bodies recorded in the memory 18, the monitoring result by the movable body monitoring unit 34, and the like, and controls the travel of the vehicle 2, for example.

For example, the travel controller 36 determines a short-term course based on the amount of operation of the operation member 17 and the movement path, and adjusts the course of the vehicle 2 so as to prevent the short-term course from intersecting with or approaching a course of another movable body. Moreover, the travel controller 36 controls the travel of the vehicle 2 so as to cause the vehicle 2 to move along the generated course.

Figure 5:
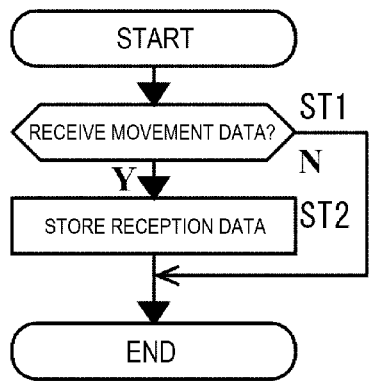
FIG. 5 is an explanatory diagram illustrating an example of processing of a receiving controller in FIG. 4.

FIG. 5 is an explanatory diagram illustrating an example of processing of the receiving controller 32 in FIG. 4.

For example, when the wireless communicating unit 11 receives new movement data, the receiving controller 32 may conduct reception processing in FIG. 5 repeatedly. Alternatively, at a periodic timing, the receiving controller 32 may conduct the reception processing in FIG. 5 repeatedly.

At a step ST1 in the reception processing in FIG. 5, the receiving controller 32 determines whether the wireless communicating unit 11 has received movement data.

The receiving controller 32 may determine not only whether the wireless communicating unit 11 receives movement data on individual movable bodies but also whether the wireless communicating unit 11 receives movement data on a group of a plurality of movable bodies. Moreover, the receiving controller 32 may simply receive movement data on a group corresponding to a plurality of movable bodies, but may not receive movement data on individual movable bodies, and may make a determination, in some cases.

If the wireless communicating unit 11 has not received movement data, the receiving controller 32 ends the reception processing in FIG. 5.

If the wireless communicating unit 11 has received movement data, the receiving controller 32 acquires the movement data, and outputs the movement data to the memory managing unit 31, at a step ST2. The memory managing unit 31 stores the newly acquired movement data in the memory 18. Thereafter, the receiving controller 32 ends the reception processing in FIG. 5.

The processing in the foregoing is repeated to store plural pieces of movement data on the respective other movable bodies at different times acquired by the receiving controller 32, in the memory 18.

Figure 6:
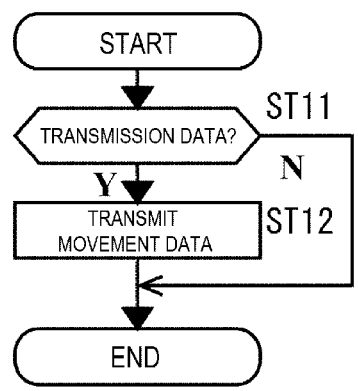
FIG. 6 is an explanatory diagram of an example of processing of a transmitting controller in FIG. 4.

FIG. 6 is an explanatory diagram of an example of processing of the transmitting controller 35 in FIG. 4.

For example, when new movement data on the host vehicle is recorded in the memory 18, the transmitting controller 35 may repeatedly conduct transmission processing in FIG. 6. Alternatively, at a periodic timing, the transmitting controller 35 may repeatedly conduct the transmission processing in FIG. 6.

At a step ST11 in the transmission processing in FIG. 6, the transmitting controller 35 determines whether the movement data stored in the memory 18 includes data to be transmitted.

If the movement data stored in the memory 18 does not include data to be transmitted, the transmitting controller 35 ends the transmission processing in FIG. 6.

If the movement data stored in the memory 18 includes data to be transmitted, at a step ST12, the transmitting controller 35 acquires the data to be transmitted from the memory 18, and outputs and transmits the data to be transmitted to the wireless communicating unit 11. Thereafter, the transmitting controller 35 ends the transmission processing in FIG. 6.

With the processing in the foregoing, the movement data that is stored in the memory 18 is transmitted to the communication apparatuses of the other movable bodies or the vehicle control system 10, as appropriate. Each of the communication apparatuses of the other movable bodies or the vehicle control system 10 stores the movement data transmitted from the host vehicle in the memory 18 thereof, and uses the movement data for control of the movement thereof. When movement data on the host vehicle has been recorded in the memory 18, the transmitting controller 35 may transmit the movement data on the host vehicle together with movement data on the other movable bodies, to the communication apparatuses of the other movable bodies or the vehicle control system 10.

Figure 7:
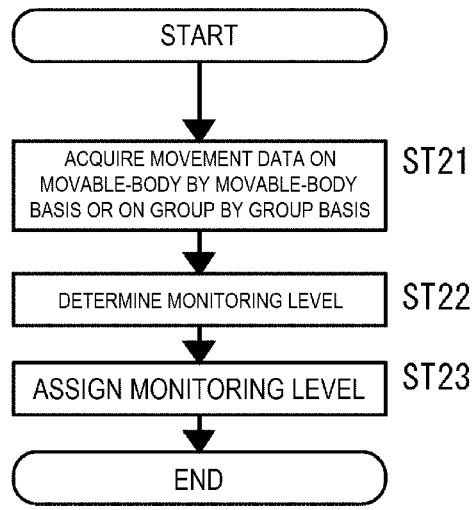
FIG. 7 is an explanatory diagram illustrating an example of processing of a movable body monitoring unit in FIG. 4.

FIG. 7 is an explanatory diagram illustrating an example of processing of the movable body monitoring unit 34 in FIG. 4.

The movable body monitoring unit 34 may repeatedly conduct monitoring processing in FIG. 7, for example, (i) when a series of movement control by the travel controller 36 has been completed one time, (ii) when new movement data on the host vehicle has been recorded in the memory 18, or (iii) at periodic timing.

At a step ST21 of the monitoring processing in FIG. 7, as for plural pieces of movement data recorded in the memory 18, the movable body monitoring unit 34 acquires the movement data on a movable-body by movable-body basis or on a group by group basis. When plural pieces of movement data on each movable body or each group at different times have been stored in the memory 18, the movable body monitoring unit 34 acquires the plural pieces of movement data.

At a step ST22, the movable body monitoring unit 34 predicts and determines, using the acquired movement data, (i) whether the movement of another movable body corresponding to the movement data influences the movement of the host vehicle and (ii) a degree of influence, and determines the monitoring level in accordance with the result of the prediction determination. The movable body monitoring unit 34 predicts courses of the other movable bodies, for example, from the movement data, and determines whether there is a possibility that the other movable body intersects with or approaches the course of the host vehicle. Moreover, the movable body monitoring unit 34 may calculate an arrival time of the other movable body to the intersecting position or the approaching position and an arrival time of the host vehicle to the intersecting position or the approaching position, and may determine whether there is a possibility that the other movable body intersects with or approaches the course of the host vehicle by considering a time difference therebetween. The movable body monitoring unit 34 uses all the movement data stored in the memory 18 to determine the movement of the other movable bodies with high accuracy.

At a step ST23, the movable body monitoring unit 34 assigns a monitoring level to the other movable body based on (i) whether the movement of the other movable body influences the movement of the host vehicle and (ii) the degree of influence.

The monitoring level to be assigned to the other movable body may be, for example, a high level when the course of the other movable body intersects with the course of the host vehicle, a middle level when the course of the other movable body approaches the course of the host vehicle, and a low level when the course of the other movable body neither intersects with nor approaches the course of the host vehicle.

Repeating the processing in the foregoing enables the movable body monitoring unit 34 to continuously monitor another movable body in accordance with an every-changing movement situation of the other movable body. Moreover, the movable body monitoring unit 34 may classify a plurality of other movable bodies according to the monitoring levels.

Figure 8:
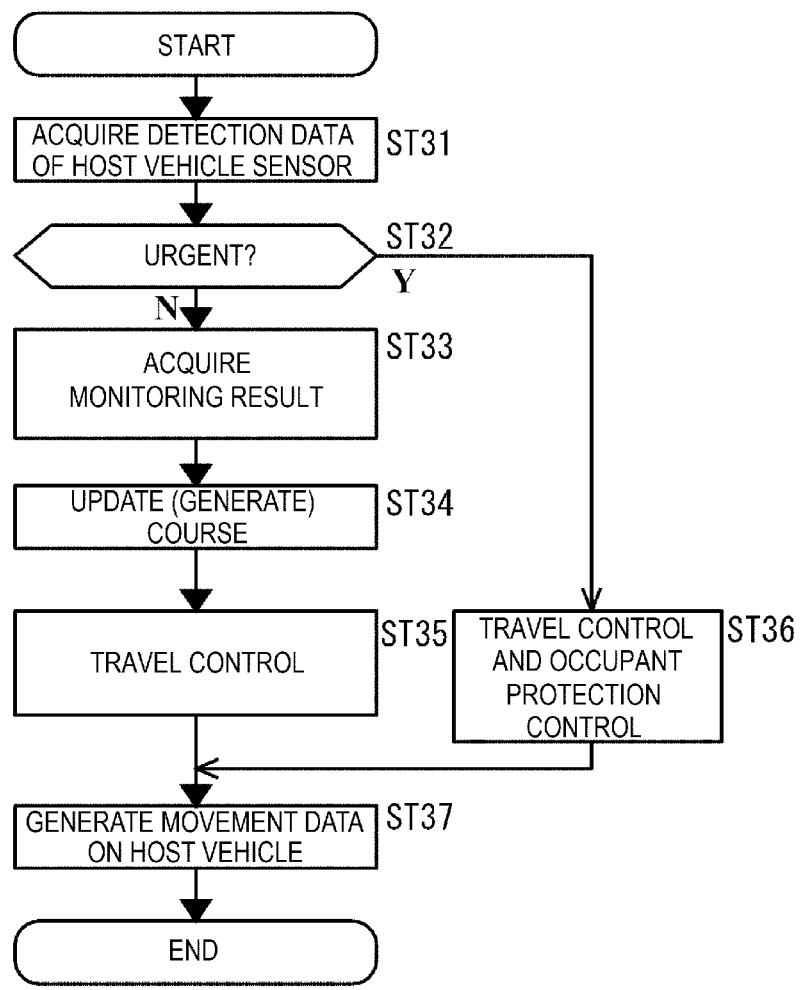
FIG. 8 is an explanatory diagram illustrating an example of processing of a travel controller serving as a vehicle control apparatus in FIG. 4.

FIG. 8 is an explanatory diagram illustrating an example of processing of the travel controller 36 serving as a vehicle control apparatus in FIG. 4.

The travel controller 36 may repeatedly conduct traveling processing in FIG. 8, for example, (i) when a previous-time series of the movement control by the travel controller 36 has completed, (ii) when new movement data on the host vehicle has been recorded in the memory 18 or (iii) at periodic timing.

At a step ST31 of the travel processing in FIG. 8, the travel controller 36 acquires detection data and the like of various host vehicle sensors that are provided to the vehicle 2.

At a step ST32, the travel controller 36 determines whether a travel state of the host vehicle is an urgent state based on the detection data of the host vehicle sensors. For example, when detecting running out of the pedestrian 3 or another vehicle into a roadway in an image ahead of the vehicle 2 captured by the image capturing device 12, the travel controller 36 determines that the travel state of the host vehicle is the urgent state.

If the travel state of the host vehicle is the urgent state, the travel controller 36 causes the processing to proceed to a step ST36. At the step ST36, the travel controller 36 executes travel control of the vehicle 2 to deal with the urgent situation, and occupant protection control. The travel controller 36 executes, for example, avoid control to instantly brake the vehicle 2 to be stopped suddenly. Moreover, when the travel sensor 15 detects the high acceleration after having started the control of the sudden stop, the travel controller 36 executes the occupant protection control using a seatbelt and an airbag. In the urgent travel control, the travel controller 36 may transmit movement data on the host vehicle indicating the urgency from the wireless communicating unit 11 to other movable bodies. This enables the other movable bodies to start necessary urgent travel control following the urgent travel control of the host vehicle. The travel controller 36 of the host vehicle may also determine whether the wireless communicating unit 11 has received movement data indicating the urgency from another movable body at the step ST32. If the wireless communicating unit 11 has received such movement data, the travel controller 36 may cause the processing to proceed to the step ST36.

If the travel state of the host vehicle is not the urgent state, the travel controller 36 causes the processing to proceed to a step ST33. At the step ST33, the travel controller 36 acquires the monitoring result by the movable body monitoring unit 34.

At a step ST34, the travel controller 36 generates or adjusts a course of the vehicle 2 in accordance with the monitoring results about the movements of the plurality of movable bodies by the movable body monitoring unit 34, and updates the course.

The travel controller 36 generates a course during a movement control period this time of the vehicle 2, for example, based on the movement path generated by the path generator 37. For example, the travel controller 36 generates a course in which the vehicle travels on a present lane without any change when the vehicle travels straight. The travel controller 36 generates a course in which the vehicle changes the lane for right or left turning and travels when the vehicles turns right or left.

Moreover, the travel controller 36 determines, based on the monitoring result, whether there is another movable body having a possibility of intersecting or approaching the course that is used for the movement control this time of the vehicle 2 during the movement control period this time of the vehicle 2. The travel controller 36 predicts a moving speed and a moving direction of a movable body having a high-level or middle-level monitoring result during the movement control period this time of the vehicle 2, and determines whether the movable body intersect with or approach the course of the host vehicle.

When there is no movable body that intersects with or approaches the course of the host vehicle during the movement control period this time of the vehicle 2, the travel controller 36 adopts the course generated based on the movement path as a course to be used for the control this time and updates the course.

When there is another movable body that intersects with or approaches the course of the host vehicle during the movement control period this time of the vehicle 2, the travel controller 36 updates the course so as to cause the course generated based on the movement path to be apart from the course of the other movable body. Alternatively, the travel controller 36 updates speed information on the course generated based on the movement path so as to allow the vehicle to stop before the intersecting position or the approaching position.

At a step ST35, the travel controller 36 controls the travel of the host vehicle, in accordance with the updated new course, by the control within a range in which the vehicle 2 travels in safety. When the occupant operates the operation member 17 during the control, the travel controller 36 may adjust the course by increasing or decreasing an amount of control relative to an amount of the operation.

At the step ST37, the travel controller 36 generates movement data on the host vehicle including new position information on the host vehicle and new time information after the control, and outputs the generated movement data to the memory managing unit 31 to store the movement data in the memory 18.

Repeating the processing in the foregoing enables the travel controller 36 to continuously control the movement of the host vehicle in accordance with an every-changing movement situation of another movable body.

Figure 9:
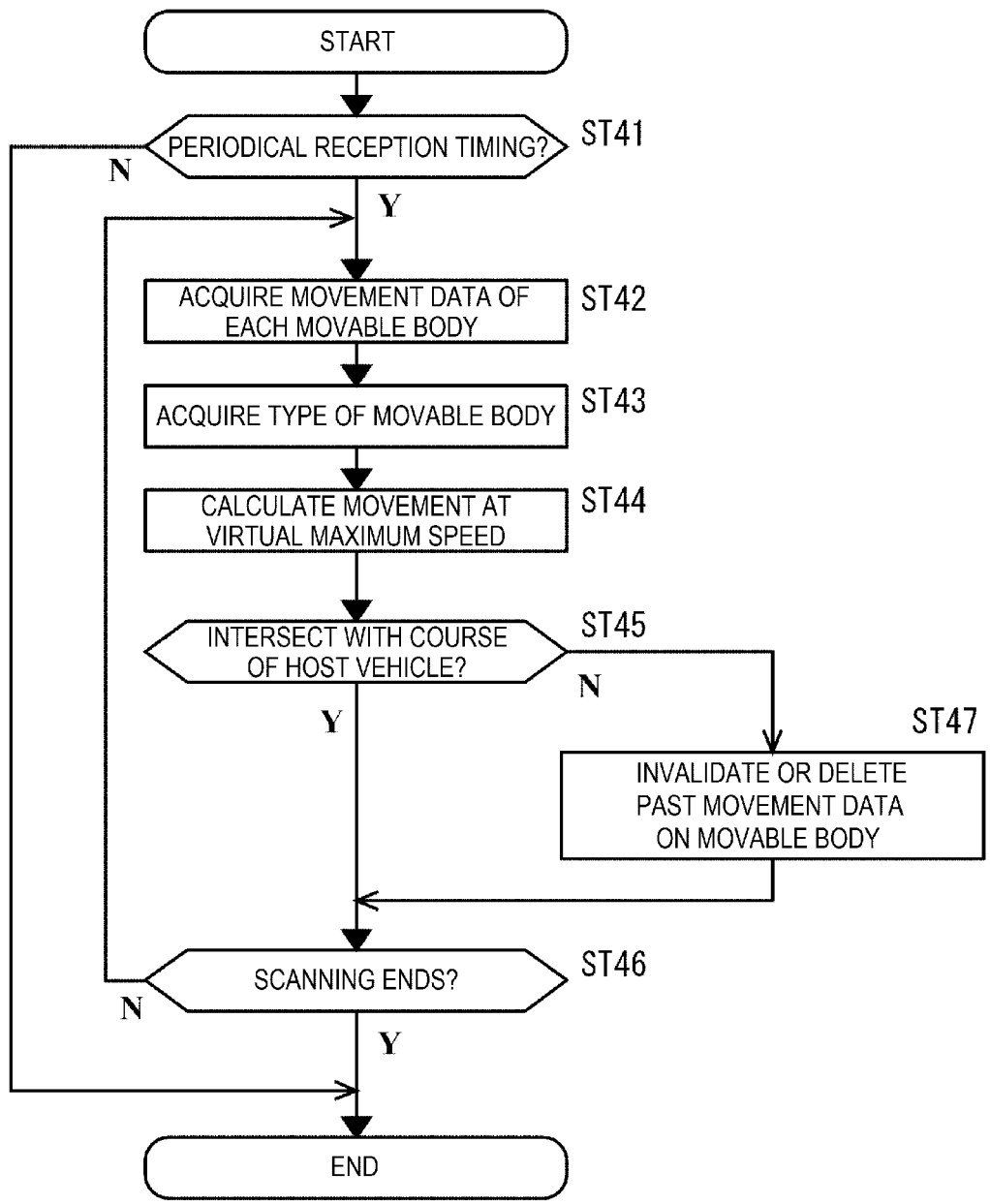
FIG. 9 is an explanatory diagram of an example of processing of a memory managing unit in FIG. 4 according to a first embodiment of the disclosure.

FIG. 9 is an explanatory diagram of an example of processing of the memory managing unit 31 in FIG. 4 according to the first embodiment of the disclosure.

At a step ST41 in data management processing for the memory 18 in FIG. 9, the memory managing unit 31 determines whether it is timing when movement data on other movable bodies is periodically received from the server apparatus 6, for example. In addition to this, for example, the memory managing unit 31 may determine whether it is periodic timing, such as 10 milliseconds, or may determine whether it is timing that the receiving controller 32 has received new movement data on another movable body. The memory managing unit 31 repeatedly executes the data management processing for the memory 18 in FIG. 9.

If it is not the timing when movement data or the like is periodically received, the memory managing unit 31 ends the data management processing in FIG. 9.

If it is the timing when movement data or the like is periodically received, the memory managing unit 31 actually starts the data management processing in FIG. 9.

At a step ST42, the memory managing unit 31 acquires movement data on each of other movable bodies from the memory 18 after delete processing.

At a step ST43, the memory managing unit 31 acquires the type of the other movable body based on attribute information in the acquired movement data. The types of the other movable body include, for example, an automobile, the pedestrian 3, and a bicycle.

At a step ST44, the memory managing unit 31 acquires a virtual maximum speed which is preset for each type of the acquired other movable body, and calculates a movement direction and a movement amount of the other movable body from the virtual maximum speed.

For example, when the type of the other movable body is an automobile, the memory managing unit 31 calculates a movement direction and a movement amount of the other movable body by setting a speed limit of a road on which the other movable body is traveling as a virtual maximum speed.

In addition to this, when the type of the other movable body is a bicycle, the memory managing unit 31 calculates a movement direction and a movement amount of the other movable body by setting a preset virtual maximum speed for the bicycle, 40 km/h, for example, as a virtual maximum speed.

In addition to this, when the type of the other movable body is a pedestrian, the memory managing unit 31 calculates a movement direction and a movement amount of the other movable body by setting a preset virtual maximum speed for the pedestrian, 20 km/h, for example, as a virtual maximum speed.

At a step ST45, the memory managing unit 31 determines whether course of the other movable body intersects with a course of the host vehicle, on the movable-body by movable-body basis.

For example, the memory managing unit 31 determines whether a movement range in a movement scheduled course of the host vehicle intersects with a movement range in a movement predicted course of the other movable body.

If the course of the host vehicle intersects with the course of the other movable body, the memory managing unit 31 causes the processing to proceed to a step ST46. The memory managing unit 31 progresses processing for next another movable body without deleting the movement data.

If the course of the host vehicle does not intersect with the course of the other movable body, the memory managing unit 31 causes the processing to proceed to a step ST47.

At the step ST47, the memory managing unit 31 deletes past movement data on the other movable body being processed, on the movable-body by movable-body basis. Instead of deleting, the memory managing unit 31 may invalidate past movement data on the other movable body being processed, on the movable-body by movable-body basis.

The memory managing unit 31 deletes past data on the other movable body from the memory 18 so as to remain the latest movement data, for example. It should be noted that a range of the past movement data to be disposed of may be changed in accordance with a travel environment and the like.

Thereafter, the memory managing unit 31 causes the processing to proceed to the step ST46.

At the step ST46, the memory managing unit 31 determines whether the scanning processing for all the other movable bodies stored in the memory 18 has been completed.

If the scanning processing for all the other movable bodies has not been completed, the memory managing unit 31 returns the processing to the step ST42, and repeats the abovementioned processing for next another movable body. Accordingly, the scanning processing is conducted for all the other movable bodies the movement data of which has been stored in the memory 18, and the past data is deleted in accordance with the virtual maximum speed of each of the other movable bodies.

Thereafter, the memory managing unit 31 ends the data management processing in FIG. 9.

By repeating the data management processing in the foregoing, the memory managing unit 31 can periodically delete the movement data that has become old in accordance with the virtual maximum speed corresponding to the type of another movable body, from the memory 18 on the movable-body by movable-body basis. This prevents the amount of data stored in the memory 18 from continuously increasing with elapse of time. It is possible to appropriately store the movement data on a plurality of other movable bodies using the memory 18 having a limited storage capacity.

As in the foregoing, in the present embodiment, movement data acquired in order to be used in the control of the traveling of the vehicle 2 is stored and recorded in the memory 18, and the memory managing unit 31 manages the record of the movement data in the memory 18. Moreover, the memory managing unit 31 acquires a virtual speed for each type of a movable body which is obtained from movement data recorded in the memory 18, and periodically deletes or invalidates the movement data from the memory 18 on the movable-body by movable-body basis, in accordance with the acquired virtual speed of each of the other movable bodies.

For example, the memory managing unit 31 predicts the movement of each of the other movable bodies on the movable-body and movable-body basis by using a maximum speed of each type of the movable body, determines whether a course of each of the other movable bodies intersects with a course of the host vehicle, and invalidates or deletes the past movement data on other movable bodies whose courses are determined not to intersect with the host vehicle, from the memory 18 on the movable-body by movable-body basis.

Therefore, in the present embodiment, for example, as for other movable bodies whose courses are determined not to intersect with the course of the host vehicle by a prediction determination based on the virtual movement at the maximum speed of each type of the movable body, it is possible to invalidate or delete movement data thereon as unnecessary movement data. Movement data having a possibility of becoming unnecessary in order to be used in the travelling and the like of the vehicle can be deleted from the memory early. Such data remains to cause not only the shortage of the memory 18, but also there is a possibility in some cases that the vehicle 2 can never move forward or the movement of the vehicle 2 is unnecessarily and excessively reactive. Moreover, as for other movable bodies whose courses are determined to intersect with the course of the host vehicle by the prediction determination based on the virtual movement at the maximum speed of each type of the movable body, the movement data thereon is continuously stored in the memory 18 as useful movement data. Movement data having a possibility of becoming useful in order to be used in the travelling and the like of the vehicle can be stored and recorded in the memory 18 during the long period.

As a result, in the present embodiment, it is possible to excellently acquire and store movement data on a plurality of movable bodies that can be collected in the traffic system 1, in the vehicle 2 such as an automobile. Moreover, in the present embodiment, based on the movement data that has been suitably acquired and stored, it is possible to excellently control the travelling and the like of the vehicle 2.

Moreover, in the present embodiment, the movement data stored in the memory 18 is appropriately deleted, so that it is possible to reduce the storage capacity of the memory 18 and the processing load of the ECU (controller) 20 that processes the movement data. Moreover, in the present embodiment, it is possible to prevent the control of the vehicle 2 from becoming impossible due to the overflow of the movement data to be stored in the memory 18. For example, it is possible to prevent a situation where the vehicle 2 does not move forward and prevent the vehicle 2 from excessively reacting.

In the present embodiment, the memory managing unit 31 deletes or invalidates the past movement data from the memory 18 on the movable-body by movable-body basis at the timing when the movement data is received and collected in accordance with a cycle in which movement data on the other movable bodies is periodically received from the server apparatus 6 or the like. Therefore, it is possible to delete unnecessary movement data in accordance with the cycle in which movement data on the other movable bodies is received. The data amount of movement data that is stored in the memory 18 can be reduced to an amount corresponding to the timing when movement data is periodically received.

Second Embodiment

Next, the traffic system 1 according to a second embodiment of the disclosure will be described. In the present embodiment, the same reference signs are used to configurations similar to those in the above-described embodiment, and illustration and descriptions thereof will be omitted. In the following description, difference points from the above-described embodiment will be mainly described.

Figure 10:
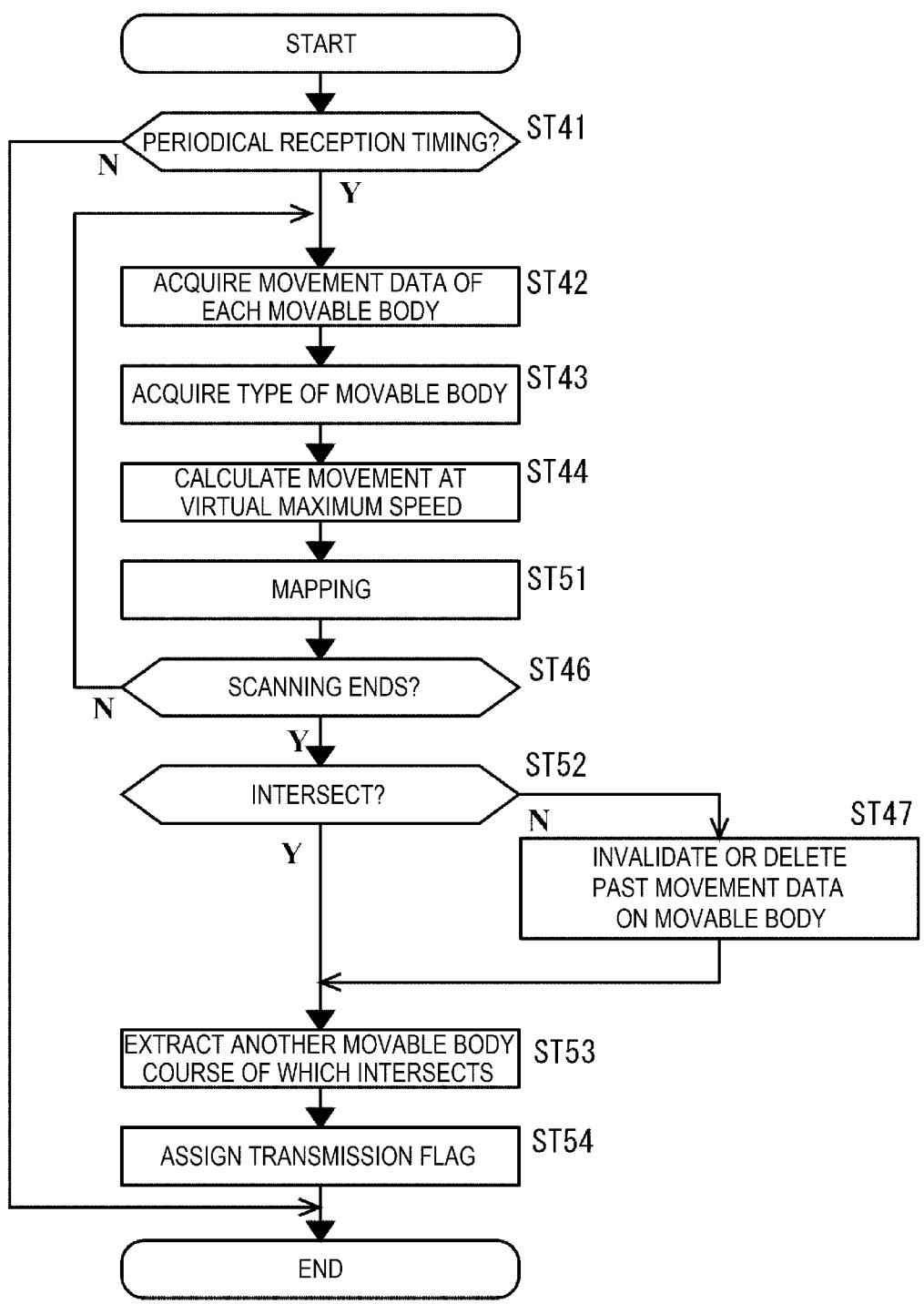
FIG. 10 is an explanatory diagram of an example of processing of the memory managing unit in FIG. 4 according to a second embodiment of the disclosure.

FIG. 10 is an explanatory diagram of an example of processing of the memory managing unit 31 in FIG. 4 according to the second embodiment of the disclosure.

The processing from the steps ST41 to ST47 in FIG. 10 is similar to that at those steps in FIG. 9 in the first embodiment.

After having acquired a movement amount and a movement direction of another movable body from the step ST42 to the step ST44, the memory managing unit 31 maps a predicted course of the other movable body on a local map of an area including the host vehicle, at a step ST51.

Thereafter, at the step ST46, the memory managing unit 31 determines whether the abovementioned scanning processing for all the other movable bodies stored in the memory 18 has been completed. The memory managing unit 31 repeats the abovementioned scanning processing until mapping for all the other movable bodies stored in the memory 18 has been completed.

When the mapping for all the other movable bodies stored in the memory 18 has been completed, the memory managing unit 31 determines whether a course of each of the movable bodies including the host vehicle intersects with a course of another movable body, at a step ST52.

If a movable body whose course does not intersect with the course of any other movable body is present, the memory managing unit 31 causes the processing to proceed to the step ST47. The memory managing unit 31 deletes past movement data on the movable bodies whose courses do not intersect with any other movable body, on the movable-body by movable-body basis. Instead of deleting, the memory managing unit 31 may invalidate the past movement data on the movable body whose course does not intersect with any other movable body, on the movable-body by movable-body basis.

If there is no movable body whose course does not intersect with the course of any other movable body, or after the processing at the step ST47 is completed, the memory managing unit 31 extracts another movable body whose course intersects, at a step ST53.

At a step ST54, the memory managing unit 31 assigns a transmission flag to movement data on the extracted other movable body. The memory managing unit 31 may assign a transmission flag to the latest movement data among a plurality pieces of movement data on the extracted other movable bodies.

Thereafter, the memory managing unit 31 ends the processing in FIG. 10.

As in the foregoing, in the present embodiment, the memory managing unit 31 deletes or invalidates, among the movement data stored in the memory 18, the movement data on other movable bodies whose courses do not intersect, on the movable-body by movable-body basis.

The movement data is deleted from the memory in this manner, so that in the subsequent processing by the transmitting controller 35, the deleted movement data on the other movable bodies is not transmitted to the communication apparatuses of the other movable bodies. Moreover, the communication apparatuses of the other movable bodies do not store the deleted movement data on the other movable bodies in the memories.

As in the foregoing, in the present embodiment, the memory managing unit 31 of each vehicle 2 determines whether the courses of the other movable bodies intersect with each other. The memory managing unit 31 of each vehicle 2 deletes or invalidates past movement data on other movable bodies whose courses are determined not to intersect from the memory 18 on the movable-body by movable-body basis. The memory managing unit 31 of each vehicle 2 does not delete or invalidate past movement data on other movable bodies whose courses are determined to intersect from the memory 18. Moreover, the transmitting controller 35 transmits, to the other movable bodies, the movement data which is stored in the memory 18 and which is managed by the memory managing unit 31.

Therefore, the transmitting controller 35 of each movable body does not transmit unnecessary movement data on the other movable bodies whose courses do not intersect with each other.

As a result, the memories 18 of the other movable bodies neither acquire nor store unnecessary movement data on a movable body that is predicted not to intersect.

Moreover, also in the traffic system 1, unnecessary movement data is not transmitted and received, so that it is possible to prevent a data band of a communication network that the traffic system 1 uses from being reduced by the unnecessary movement data.

It should be noted that in the present embodiment, the memory managing unit 31 causes movement data on another movable body having no possibility of intersecting with the course of the host vehicle but having a possibility of intersecting with the course of any still another movable body to remain in the memory 18. In this case, there is a high possibility that the storage capacity of the memory 18 becomes insufficient.

Accordingly, at the step ST54, the memory managing unit 31 may, for example, classify movement data that is recorded in the memory 18, excluding movement data on a movable body having a possibility of intersecting with the course of the host vehicle, in accordance with a degree of intersecting between the courses of the other movable bodies, on a movable-body by movable-body basis. When the amount of the movement data in the memory 18 exceeds a predetermined amount, the memory managing unit 31 may invalidate or delete past movement data on movable bodies having low possibilities of intersecting between the courses of the other movable bodies, from the memory 18 on the movable-body by movable-body basis.

Such processing is executed to enable the memory managing unit 31 (i) to classify movement data that is recorded in the memory 18, excluding the movement data on the movable body having the possibility of intersecting with the course of the host vehicle, in accordance with the degree of intersecting between the courses of the other movable bodies and (ii) to invalidate or delete, when the amount of the movement data in the memory 18 exceeds the predetermined amount, the past movement data on the movable bodies having the low possibilities of intersecting between the courses of the other movable bodies, from the memory 18 on the movable-body by movable-body basis.

As a result, in each vehicle 2, it is possible to store the movement data that is related to the host vehicle with a higher priority than the movement data that is not related to the host vehicle in the memory 18, while storing the movement data on movable bodies having possibilities of intersecting between the courses of the other movable bodies as much as possible, and prevents a situation in which the storage capacity of the memory 18 becomes insufficient. Moreover, the transmitting controller 35 can transmit useful movement data having a high possibility of intersecting with a higher priority than unnecessary movement data having a low possibility of intersecting, in each movable body.

The embodiments in the foregoing are preferred examples of the disclosure, but do not limit the disclosure to these. Many modifications and changes may be made to the embodiments without departing from the sprit and scope of the disclosure.

For example, in the above embodiments, the vehicle control system 10 and the communication apparatus which are provided to the movable body use the movable body monitoring unit 34 and the travel controller 36 in order to control the movement of the vehicle 2 based on the movement data stored in the memory 18.

Alternatively, for example, the vehicle control system 10 and the communication apparatus that are provided to the movable body may conduct processing similar to that of the movable body monitoring unit 34 in the processing of the travel controller 36, and simply use the travel controller 36. In this case, the travel controller 36 may conduct processing similar to that of the movable body monitoring unit 34 at the step ST33 in FIG. 8, for example. Moreover, when the movable body monitoring unit 34 is integrated with the travel controller 36, the travel controller 36 may update, without assigning a monitoring level, the course so as to adjust the course, using the monitoring determination result as it is.

In the above embodiments, the vehicle control system 10 and the communication apparatus that are provided to the movable body includes the receiving controller 32 and the memory managing unit 31.

Alternatively, for example, the vehicle control system 10 and the communication apparatus that are provided to the movable body may integrate the memory managing unit 31 with the receiving controller 32, and cause the receiving controller 32 to conduct the delete processing of the movement data from the memory 18. In this case, the receiving controller 32 may delete, when receiving movement data, for example, the movement data depending on the presence or absence of the intersecting, on the movable-body by movable-body basis.

In the above embodiments, the vehicle control system 10 and the communication apparatus that are provided to the movable body includes the travel controller 36 and the transmitting controller 35.

Alternatively, for example, the vehicle control system 10 and the communication apparatus that are provided to the movable body may integrate the transmitting controller 35 with the travel controller 36, and cause the travel controller 36 to conduct the transmission processing of the movement data. In this case, the travel controller 36 may transmit the stored movement data on the host vehicle by the wireless communicating unit 11, after the processing at the step ST37 in FIG. 8, for example.

In the above embodiments, the vehicle control system 10 provided to the vehicle 2 is provided with the respective units illustrated in FIG. 4. Alternatively, for example, the vehicle control system 10 may be provided with a part of the functions in FIG. 4. Moreover, the vehicle control system 10 may be provided with all of the functions in FIG. 4 by the remaining functions in FIG. 4 being provided by a mobile terminal, for example, with respect to the part of the functions in FIG. 4, which are uniquely provided.

Moreover, the vehicle control system 10 may be provided a part of the functions in FIG. 4, and may conduct the above-mentioned various processing in that state. The vehicular communication apparatus 22 may be provided with a part of the functions in FIG. 4, as the host vehicle sensor to be mounted on the vehicle 2, for example. Specifically, when conducting the control other than the travel in the vehicle 2, the vehicle control system 10 does not need to be provided with all the host vehicle sensors in FIG. 4, the operation member 17, and the path generator 37 of the ECU 20. Even in this case, the vehicular communication apparatus 22 that is provided to the vehicle control system 10 configures the traffic system 1 that transmits and receives movement data and the like to and from the server apparatus 6.

In the above embodiments, the vehicular communication apparatus 22 has been described as a part of the vehicle control system 10. A control system for a low-speed movable body such as the pedestrian 3 and a bicycle may be also provided with functions similar to those of the above-mentioned the vehicular communication apparatus 22. Moreover, the above-mentioned vehicle control system 10 and the vehicular communication apparatus 22 may also be applied to the vehicle 2 of a different type, such as an electric train, other than the vehicle 2.

The invention claimed is:

1. A vehicular communication apparatus configured to be mounted on a host vehicle, the vehicular communication apparatus comprising:
    a controller configured to:
        acquire movement data related to movements of other movable bodies;
        store and record the movement data related to the movements of the other movable bodies in a memory;
        manage the record of the movement data in the memory;
        acquire a virtual speed of each movable body of the other movable bodies, wherein the virtual speed is obtained from the movement data recorded in the memory;
        determine a possibility of intersection of a movable body of the other movable bodies with a course of the host vehicle based on the acquired virtual speed of the movable body;
        classify the movement data in the memory based on the determination and a degree of intersection between courses of the other movable bodies, wherein
            the movement data of the movable body having the possibility of intersection with the course of the host vehicle is excluded from the classification of the movement data;
        invalidate or delete the movement data recorded in the memory on a movable-body by movable-body basis, wherein the movement data that is invalidated or deleted is of a set of movable bodies of the other movable bodies, each movable body of the set of movable bodies has a low possibility of intersection between the courses of the other movable bodies, the movement data in the memory is invalidated or deleted when an amount of the movement data in the memory exceeds a predetermined amount, and the movement data in the memory is invalidated or deleted in accordance with the classification of the movement data; and control the host vehicle based on the invalidation or the deletion of the movement data from the memory.

2. The vehicular communication apparatus according to claim 1, wherein the controller is further configured to predict movement of each movable body of the other movable bodies on the movable-body by movable-body basis, using a maximum speed of each type of each movable body of the other movable bodies, determine whether a course of each movable of the other movable bodies intersects with the course of the host vehicle, and invalidate or delete the movement data on the other movable bodies whose courses are determined not to intersect with the course of the host vehicle, on the movable-body by movable-body basis.

3. The vehicular communication apparatus according to claim 1, wherein the controller is further configured to invalidate or delete the movement data recorded in the memory on the movable-body by movable-body basis, in accordance with a cycle of the acquisition of the movement data on the other movable bodies.

4. A vehicle control system comprising:

the vehicular communication apparatus according to claim 1; and a vehicle control apparatus configured to control the host vehicle using the movement data recorded in the memory of the vehicular communication apparatus.

5. A traffic system comprising:

the vehicular communication apparatus according to claim 1; and a server apparatus configured to transmit and receive the movement data related to the movements of the other movable bodies to and from the vehicular communication apparatus.

6. A vehicular communication apparatus configured to be mounted on a host vehicle, the vehicular communication apparatus comprising:

a controller configured to:

acquire movement data related to movements of other movable bodies;

store and record the movement data related to the movements of the other movable bodies in a memory;

manage the record of the movement data in the memory; and transmit the movement data recorded in the memory to the other movable bodies, wherein the controller is further configured to:

determine a possibility of intersection of a movable body of the other movable bodies with a course of the host vehicle based on the movement data of the movable body;

determine whether courses of the other movable bodies intersect with each other;

classify the movement data in the memory based on the determination of the possibility of intersection of the movable body with the host vehicle and a degree of intersection between the courses of the other movable bodies, wherein the movement data of the movable body having the possibility of intersection with the course of the host vehicle is excluded from the classification of the movement data;

invalidate or delete the movement data, stored in the memory, on the other movable bodies, wherein the movement data is invalidated or deleted for a set of movable bodies of the other movable bodies whose courses are determined not to intersect, the movement data is invalidated or deleted on a movable-body by movable-body basis, the movement data in the memory is invalidated or deleted in accordance with the classification of the movement data, and the movement data in the memory is invalidated or deleted when an amount of the movement data in the memory exceeds a predetermined amount;

not invalidate or delete the movement data, stored in the memory, on the other movable bodies whose courses are determined to intersect;

control the host vehicle based on the invalidation or the deletion of the movement data from the memory; and transmit, to the other movable bodies, the movement data which is in the memory based on the invalidation or the deletion of the movement data.

7. The vehicular communication apparatus according to claim 6, wherein the controller is further configured to invalidate or delete the movement data recorded in the memory on the movable-body by movable-body basis, in accordance with a cycle of the acquisition of the movement data on the other movable bodies.

8. A vehicle control system comprising:

the vehicular communication apparatus according to claim 6; and a vehicle control apparatus configured to control the host vehicle using the movement data recorded in the memory of the vehicular communication apparatus.

9. A traffic system comprising:

the vehicular communication apparatus according to claim 6; and a server apparatus configured to transmit and receive the movement data related to the movements of the other movable bodies to and from the vehicular communication apparatus.

10. A vehicular communication apparatus configured to be mounted on a first movable body, the vehicular communication apparatus comprising:

circuitry configured to acquire movement data related to movements of other movable bodies different from the first movable body;

store and record the acquired movement data related to the movements of the other movable bodies in a memory;

manage the record of the movement data in the memory, acquire a virtual speed of each movable body of the other movable bodies, wherein the virtual speed is obtained from the recorded movement data;

determine a possibility of intersection of a second movable body of the other movable bodies with a course of the first movable body based on the acquired virtual speed of the second movable body;

classify the movement data in the memory based on the determination and a degree of intersection between courses of the other movable bodies, wherein
the movement data of the second movable body having the possibility of intersection with the course of the first movable body is excluded from the classification of the movement data;

invalidate or delete the recorded movement data on a movable-body by movable-body basis, wherein
the movement data that is invalidated or deleted is of a set of movable bodies of the other movable bodies,
each movable body of the set of movable bodies has a low possibility of intersection between the courses of the other movable bodies,
the movement data in the memory is invalidated or deleted when an amount of the movement data in the memory exceeds a predetermined amount, and
the movement data in the memory is invalidated or deleted in accordance with the classification of the movement data; and control the first movable body based on the invalidation or the deletion of the movement data from the memory.

11. A vehicular communication apparatus configured to be mounted on a first movable body, the vehicular communication apparatus comprising:
circuitry configured to:
acquire movement data related to movements of other movable bodies different from the first movable body;
store and record the acquired movement data related to the movements of the other movable bodies in a memory;
manage the record of the movement data in the memory;
transmit the movement data recorded in the memory to the other movable bodies, wherein
the circuitry is further configured to determine a possibility of intersection of a second movable body of the other movable bodies with a course of the first movable body based on the movement data of the second movable body;

determine whether courses of the other movable bodies intersect with each other;

classify the movement data in the memory based on the determination of the possibility of intersection of the second movable body with the first movable body and a degree of intersection between the courses of the other movable bodies, wherein
the movement data of the second movable body having the possibility of intersection with the course of the first movable body is excluded from the classification of the movement data;

invalidate or delete the stored movement data on the other movable bodies, wherein
the movement data is invalidated or deleted for a set of movable bodies of the other movable bodies whose courses are determined not to intersect,
the movement data is invalidated or deleted on a movable-body by movable-body basis,
the movement data in the memory is invalidated or deleted in accordance with the classification of the movement data, and
the movement data in the memory is invalidated or deleted when an amount of the movement data in the memory exceeds a predetermined amount;

not invalidate or delete the stored movement data on the other movable bodies whose courses are determined to intersect;

control the first movable body based on the invalidation or the deletion of the movement data from the memory; and transmit, to the other movable bodies, the movement data stored in the memory based on the invalidation or the deletion of the movement data.

* * * * *